United States Patent
Lee

(10) Patent No.: US 8,303,058 B2
(45) Date of Patent: Nov. 6, 2012

(54) REFRIGERATOR WITH TV AND RADIO FUNCTION

(75) Inventor: Ik-Kyu Lee, Gyeongsangnam-Do (KR)

(73) Assignee: LG Electronics Inc., Seoul (KR)

( * ) Notice: Subject to any disclaimer, the term of this patent is extended or adjusted under 35 U.S.C. 154(b) by 1742 days.

(21) Appl. No.: 11/579,332

(22) PCT Filed: Apr. 29, 2005

(86) PCT No.: PCT/KR2005/001247
§ 371 (c)(1),
(2), (4) Date: Nov. 1, 2006

(87) PCT Pub. No.: WO2005/107251
PCT Pub. Date: Nov. 10, 2005

(65) Prior Publication Data
US 2008/0024685 A1    Jan. 31, 2008

(30) Foreign Application Priority Data

| May 3, 2004 | (KR) | 10-2004-0031166 |
| May 3, 2004 | (KR) | 10-2004-0031167 |
| Jun. 21, 2004 | (KR) | 10-2004-0046286 |

(51) Int. Cl.
A47B 96/04    (2006.01)
H04N 7/00    (2006.01)
H04N 5/64    (2006.01)
H05K 5/00    (2006.01)
F25B 49/00    (2006.01)

(52) U.S. Cl. ... 312/401; 348/552; 348/836; 361/679.01; 62/126

(58) Field of Classification Search .................. 348/836; 62/125; 312/401; 361/679.01
See application file for complete search history.

(56) References Cited

U.S. PATENT DOCUMENTS

| 5,079,438 | A * | 1/1992 | Heung | 307/141 |
| 6,359,270 | B1 * | 3/2002 | Bridson | 219/679 |
| 6,430,946 | B2 * | 8/2002 | Roh et al. | 62/125 |
| 6,853,399 | B1 * | 2/2005 | Gilman et al. | 348/61 |

(Continued)

FOREIGN PATENT DOCUMENTS

CN    2585829    11/2003

(Continued)

OTHER PUBLICATIONS

MAchine Translation of JP 2001289555.*

(Continued)

Primary Examiner — Joshua J Michener
Assistant Examiner — Ryan Kwiecinski
(74) Attorney, Agent, or Firm — Ked & Associates LLP

(57) ABSTRACT

A refrigerator is provided that allows a user to watch a TV broadcast program or listen to a radio broadcast. The refrigerator includes a main controller that selects a TV function or a radio function according to a user's request, a radio tuner that receives voice data included in a frequency band of a radio set when the radio function is selected by the main controller, a TV driving circuit that receives a TV broadcast program when the TV function is selected by the main controller and outputs image data and voice data included in the TV broadcast program, a TV screen that displays the image data, and a speaker that outputs the voice data included in the TV broadcast program or the voice data included in the frequency band.

14 Claims, 7 Drawing Sheets

U.S. PATENT DOCUMENTS

| | | |
|---|---|---|
| 7,262,810 B2 * | 8/2007 | Roh et al. .................. 348/552 |
| 7,319,407 B2 * | 1/2008 | Jang et al. ................ 340/691.1 |
| D566,732 S * | 4/2008 | Yeo et al. ................... D15/89 |
| 7,861,542 B2 * | 1/2011 | Rozendaal et al. ............. 62/127 |
| 2001/0025497 A1 * | 10/2001 | Roh et al. ................... 62/125 |
| 2001/0052741 A1 * | 12/2001 | Yun ........................ 312/405 |
| 2002/0113906 A1 | 8/2002 | Katoh |
| 2003/0103023 A1 * | 6/2003 | Ootsuka et al. ............... 345/87 |
| 2003/0136135 A1 * | 7/2003 | Kim et al. ................... 62/125 |
| 2004/0070696 A1 | 4/2004 | Roh et al. |
| 2004/0093379 A1 * | 5/2004 | Roh et al. ................... 709/203 |
| 2004/0156170 A1 * | 8/2004 | Mager et al. ................. 361/683 |
| 2004/0177624 A1 * | 9/2004 | Wo ......................... 62/125 |
| 2004/0179316 A1 * | 9/2004 | Tsai ........................ 361/103 |
| 2005/0097912 A1 * | 5/2005 | Nam et al. ................... 62/331 |
| 2005/0134473 A1 * | 6/2005 | Jang et al. ................ 340/691.1 |
| 2006/0021360 A1 * | 2/2006 | Kim et al. ................... 62/126 |
| 2010/0043466 A1 * | 2/2010 | Oh et al. .................... 62/125 |
| 2010/0258356 A1 * | 10/2010 | Anandampillai et al. . 177/25.16 |
| 2011/0085287 A1 * | 4/2011 | Ebrom et al. ............ 361/679.01 |

FOREIGN PATENT DOCUMENTS

| | | |
|---|---|---|
| JP | 02-251072 | 10/1990 |
| JP | 4-045326 | 4/1992 |
| JP | 07-274087 | 10/1995 |
| JP | 2001-289555 | 10/2001 |
| JP | 2001289555 | * 10/2001 |
| JP | 2001309250 | 11/2001 |
| JP | 2003-033078 | 1/2003 |
| JP | 3095497 | 5/2003 |
| KR | 10-0211413 | 3/1992 |
| KR | 10-0381182 | 12/2001 |

OTHER PUBLICATIONS

Korean Office Action dated Feb. 7, 2011 (Application No. 10-2004-0031167).

United Kingdom Office Action dated Feb. 10, 2010.

Japanese Office Action dated Aug. 16, 2010 (Application No. 2007-511275).

* cited by examiner

US 8,303,058 B2

REFRIGERATOR WITH TV AND RADIO FUNCTION

TECHNICAL FIELD

The present invention relates to a refrigerator and, particularly to a refrigerator having a refrigerating chamber and a freezing chamber.

BACKGROUND ART

In general, the refrigerator is an equipment having a refrigerating device and a freezing device for keeping various food items at a suitable temperature. The refrigerating device and the freezing device control their internal temperatures by using a cooling cycle. The cooling cycle includes a compressor, a condenser, an evaporator and a refrigerant pipe connecting them together, and cooling air required in the refrigerator is generated through heat exchange between a refrigerant flowing in the refrigerant pipe and external air.

A general refrigerator will now be described with reference to FIG. 1. FIG. 1 is a perspective view of a general refrigerator.

As shown in FIG. 1, the general refrigerator includes a freezing chamber 10 for keeping food items stored therein frozen and a refrigerating chamber 12 for keeping food items stored therein cold. Cooling air discharge holes 11 are provided at each section in the refrigerating chamber 12 in order to discharge cooling air.

When power is applied to the refrigerator and the cooling cycle is driven, cooling air generated by the driving of the cooling cycle is introduced into the refrigerator through the cooling air discharge holes 11. The temperature inside the refrigerator is lowered by the cooling air introduced into the refrigerator, and a temperature detecting unit (not shown) installed at the refrigerator measures a temperature inside the refrigerator. A main control unit (not shown) installed at the refrigerator controls a temperature inside the refrigerator by controlling a flow of cooling air introduced into the refrigerator through the cooling air discharge holes 11 based on the measured temperature value and a pre-set reference temperature value.

As stated above, the general refrigerator is limited in its function to perform only the refrigerating function and the freezing function. For example, if the user wants to watch a TV or listen to a radio program at the kitchen where the refrigerator is positioned, a TV set or a radio set must be installed in the kitchen for users' inconvenience.

DISCLOSURE OF INVENTION

Technical Problem

Therefore, one object of the present invention is to provide a refrigerator capable of selectively outputting a TV broadcast signal and a radio broadcast signal to allow a user to watch a TV broadcast program or listen to a radio broadcast program in the kitchen.

Another object of the present invention is to provide a refrigerator capable of reducing power consumption by selectively performing a TV function and a radio function through a main controller.

Still another object of the present invention is to provide a refrigerator capable of preventing an overcurrent from being applied into a unit providing a TV function and a radio function.

Technical Solution

To achieve these and other advantages and in accordance with the purpose of the present invention, as embodied and broadly described herein, there is provided a refrigerator including: a main controller for selecting a TV function or a radio function according to a user's request; a radio tuner for receiving voice data included in a frequency band of a radio set when the radio function is selected by the main controller; a TV driving circuit for receiving a TV broadcast program when the TV function is selected by the main controller, and outputting image data and voice data included in the TV broadcast program; a TV screen for displaying the image data; and a speaker for outputting the voice data included in the TV broadcast program or the voice data included in the frequency band.

To achieve the above objects, there is also provided a refrigerator including: a first display unit for displaying a temperature inside a refrigerator; a main controller for selecting a TV function or a radio function according to a user's request; a radio tuner for receiving voice data included in a frequency band of a radio set when the radio function is selected by the main controller; a TV driving circuit for receiving a TV broadcast program when the TV function is selected by the main controller, and outputting image data and voice data included in the TV broadcast program; a TV screen for displaying the image data; a speaker for outputting the voice data included in the TV broadcast program or the voice data included in the frequency band; and a second display unit for displaying the frequency band of the radio set and a volume of the voice data included in the frequency band, or displaying a TV channel number corresponding to the broadcast program and a volume of the voice data included in the broadcast program.

To achieve the above objects, there is also provided a refrigerator including: a first display unit for displaying a temperature inside a refrigerator; a main controller for selecting a TV function or a radio function according to a user's request; a radio tuner for receiving voice data included in a frequency band of a radio set when the radio function is selected by the main controller; a TV driving circuit for receiving a TV broadcast program when the TV function is selected by the main controller, and outputting image data and voice data included in the TV broadcast program; an LCD (Liquid Crystal Display) for displaying the image data; a speaker for outputting the voice data included in the TV broadcast program or the voice data included in the frequency band; a second display unit for displaying the frequency band of the radio set and a volume of the voice data included in the frequency band, or displaying a TV channel number corresponding to the broadcast program and a volume of the voice data included in the broadcast program; and a cooling fan for externally releasing heat generated when the TV function or the radio function is selected.

Herein, when a switch for applying power to the TV driving circuit or to the radio tuner is turned on, the main controller applies power to the cooling fan when a pre-set time elapses, and when the operation of the TV driving circuit and the radio tuner is stopped, the main controller immediately stops the cooling fan.

Advantageous Effects

The refrigerator in accordance with the present invention has many advantages.

First, by providing the TV function and the radio function at the refrigerator, a user can watch a TV program or listen to a radio program without installation of an additional TV set or a radio set in a kitchen or the like where a refrigerator is positioned.

Second, because the general control operation of the refrigerator, the radio tuner and the TV driving circuit are selectively controlled through one main controller, power consumption can be reduced.

Third, in controlling the TV/radio function, each select signal of the TV power switch sw5 and the radio power switch sw0 is previously stored, and then, when the main power switch 55 is newly turned on, power is automatically applied to the TV driving circuit 50 or to the radio tuner 30 according to the stored select signal. Accordingly, the user can watch a TV broadcast program or listen to a radio broadcast program conveniently without having to turn on the TV power switch sw5 or the radio power switch sw0.

Fourth, since the cooling fan 60 is operated when a pre-set time elapses after the TV power switch sw5 or the radio power switch sw0 is turned on, the TV driving circuit 50 and the radio tuner 30 can be prevented from being damaged due to a possible overcurrent applied thereto, and also, power consumption can be reduced.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

A unit for allowing a user to watch a TV broadcast program or listen to a radio broadcast through a refrigerator positioned in a kitchen will now be described with reference to FIGS. 2 and 3.

Figure 1:
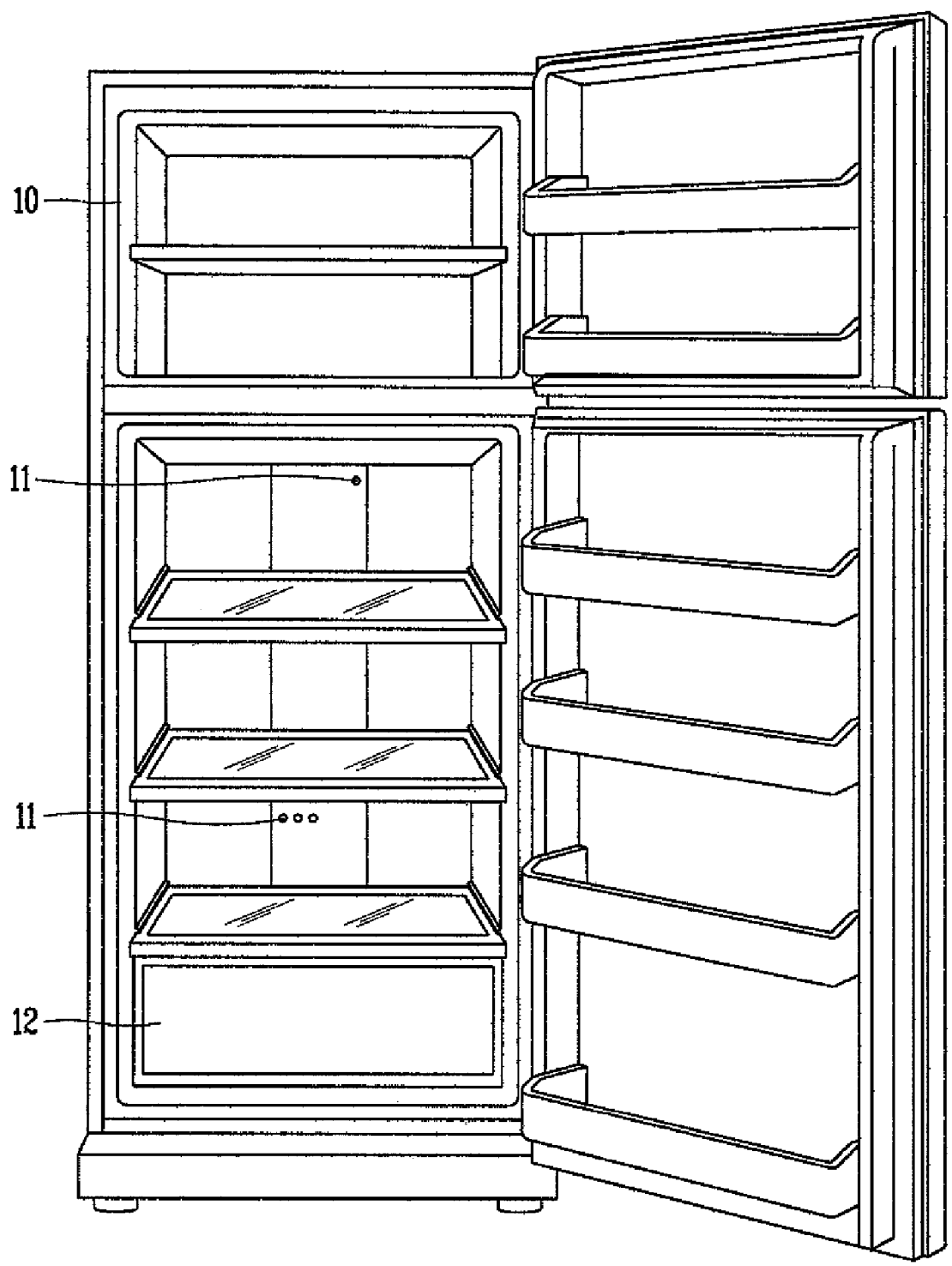
FIG. 1 is a perspective view of a general refrigerator.
Figure 2:
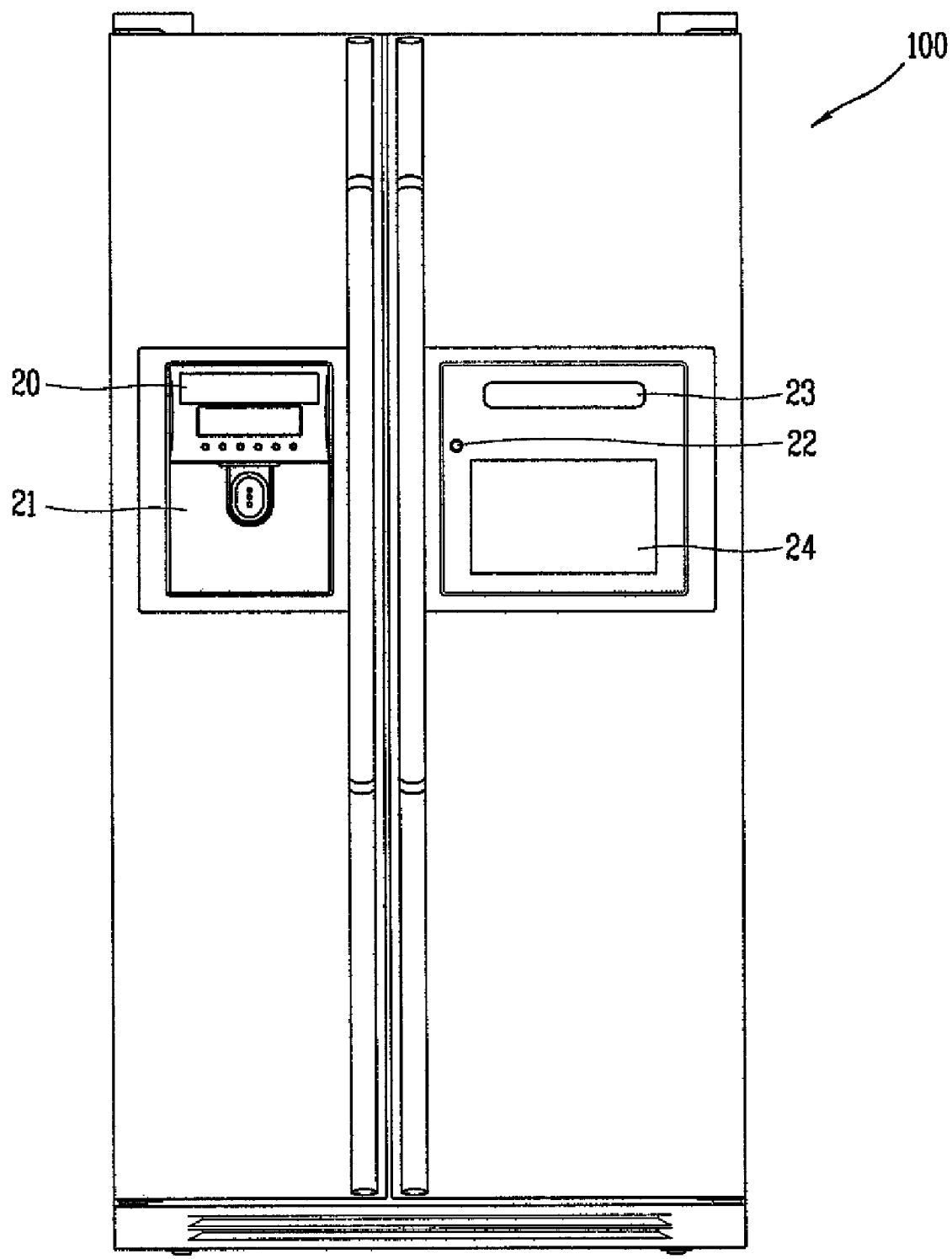
FIG. 2 is a perspective view of a refrigerator in accordance with the present invention.

FIG. 2 is a perspective view of a refrigerator in accordance with the present invention.

As shown in FIG. 2, a refrigerator 100 in accordance with the present invention includes: a first display unit 20 installed at a front side of a main body of the refrigerator 100 and displaying a general operation function of the refrigerator 100 and a temperature inside the refrigerator 100; a dispenser 21 installed at the front surface of the refrigerator body 100 and providing ice cubic and water; a speaker 22 for outputting voice and data according to a TV function or a radio function selected by a user; a second display unit 23 for displaying a frequency band or a volume according to the radio function or displaying a channel number and a volume according to the TV function; and a TV screen (e.g., LCD) 24 installed at the front surface of the refrigerator body 100 and displaying image data according to the TV function. Herein, the TV screen 24 can be formed as an LCD or as a PDP (Plasma Display Panel).

The refrigerator 100 controls an operation of a refrigerating device and a freezing device according to a temperature condition. In addition, the refrigerator 100 outputs a TV broadcast program according to the TV function selected by user's manipulation or outputs a radio broadcast signal according to a radio function selected by user's manipulation.

Figure 3:
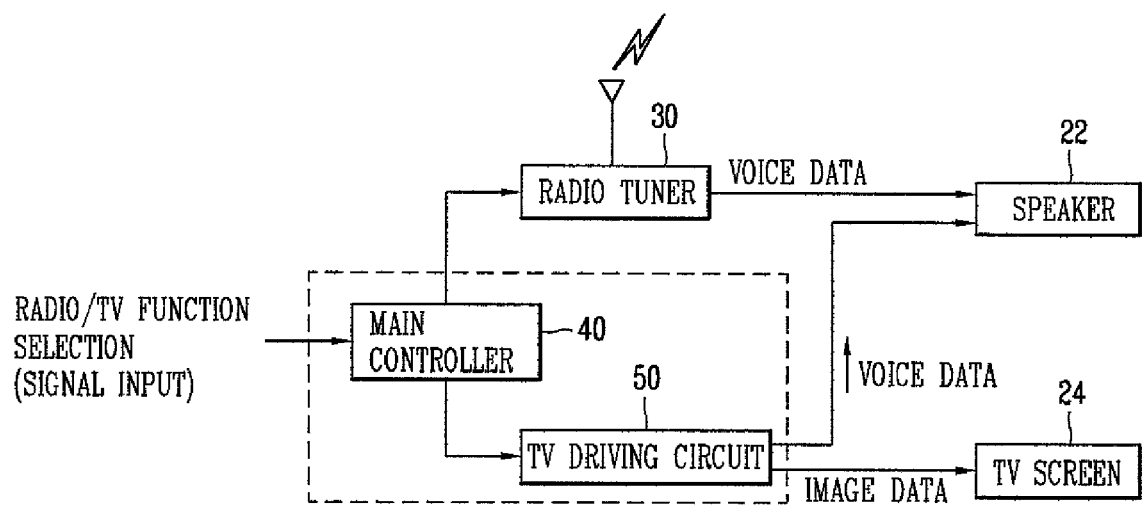
FIG. 3 shows the construction of a unit for providing a TV function and a radio function installed at the refrigerator in accordance with the present invention.

FIG. 3 shows the construction of a unit for providing the TV function and the radio function in stalled at the refrigerator.

As shown in FIG. 3, the unit for providing the TV function and the radio function as installed at the refrigerator includes: a main controller 40 for selecting the TV function or the radio function according to a user's request signal; a TV driving circuit 50 for receiving a TV broadcast program corresponding to a specific channel under the control of the main controller 40; a TV screen 24 for displaying image data included in the TV broadcast program; a radio tuner 30 for receiving voice data included in a specific radio frequency band under the control of the main controller 40; and a speaker 22 for outputting voice data included in the TV broadcast program or voice data included in the radio frequency band.

The operation of the unit for providing the TV function and the radio function installed at the refrigerator in accordance with the present invention will now be described in detail.

The main controller 40 controls a general operation of the refrigerator, applies power to the TV driving circuit 50 when the user selects the TV function, and applies power to the radio tuner 30 when the user selects the radio function.

When power is applied to the TV driving circuit 50, the TV driving circuit 50 receives a TV broadcast program corresponding to a channel selected by the user, outputs image data included in the received TV broadcast program on the TV screen 24, and outputs voice data included in the TV broadcast program to the speaker 22. In this case, the user can select a desired TV channel number through a touch panel.

The TV screen 24 displays the image data and the speaker 22 outputs the voice data included in the TV broadcast program.

When the user selects the radio function, the radio tuner 30 receives voice data corresponding to a frequency band selected by the user and outputs the received voice data to the speaker 22.

Accordingly, the user who uses the refrigerator can watch a desired TV broadcast program or listen to a radio broadcast through the refrigerator 100 in the kitchen.

The circuit of the unit for providing the TV function and the radio function as installed at the refrigerator in accordance with the present invention can be constructed variably by a person skilled in the art through FIG. 3, of which a preferred embodiment will now be described with reference to FIG. 4.

Figure 4:
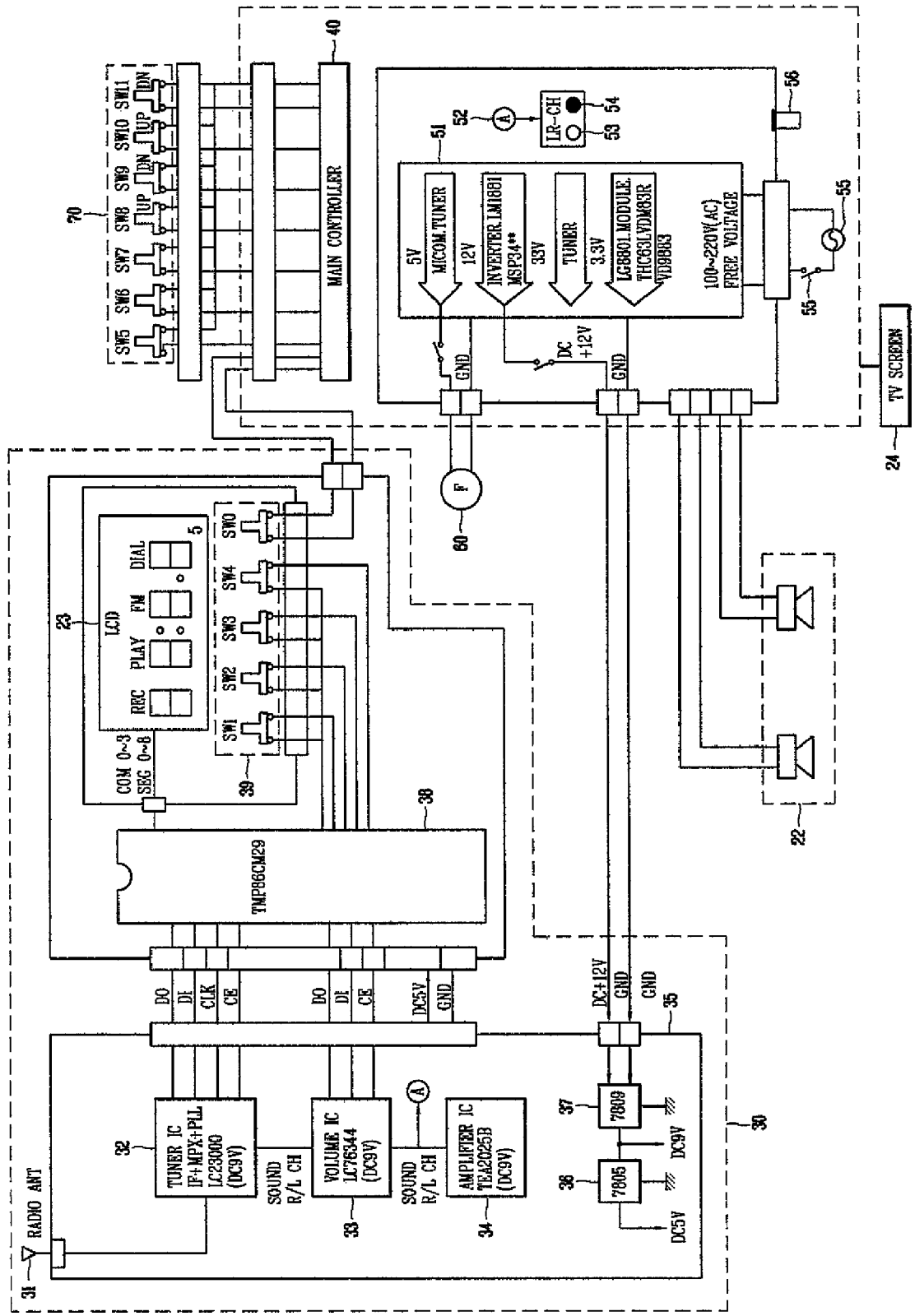
FIG. 4 is a detailed circuit diagram of the unit for providing the TV function and the radio function in accordance with the present invention.

FIG. 4 is a detailed circuit diagram of the unit for providing the TV function and the radio function in accordance with the present invention.

The radio tuner 30 is divided into a radio receiver 35 connected to an antenna 31 and a microcontroller 38.

The radio receiver 35 includes a tuner IC (Integrated Circuit) for controlling a radio frequency band, a volume IC for controlling a radio volume, and an amplifier IC 34. The tuner IC 32 includes an intermediate frequency block filter and a PLL (Phase Locked Loop) module. The tuner IC 32, the volume IC 33 and the amplifier IC 34 are driven by DC 9V. The radio receiver 35 further includes control devices 36 and 37 for generating a voltage required for the radio receiver 35. A radio volume signal processed in the radio receiver 35 is outputted to the speaker 22 through left and right channels 53 and 54 of the TV driving circuit 50.

The tuner IC 32 and the volume IC 33 are connected to the microcontroller 38 through nine ports of, for example, a DO, a DI, a CLK, a DI, a CLK, a CE, a DC5V and a GND.

The radio tuner 30 further includes a radio signal selecting unit 39 for selecting a radio volume and a frequency band. The radio signal selecting unit 39 includes up/down switches (sw3 and sw4) of a radio volume, up/down switches (sw1 and sw2) of a radio frequency band, and a power switch (sw0).

When the user selects the power switch sw0 through the radio signal selecting unit 39 and then selects the frequency switches sw1 and sw2 and the volume switches sw3 and sw4, a frequency band and volume control signal according to the selection is outputted to the microcontroller 38. The microcontroller 38 controls the tuner IC 32 and the volume IC 33 based on the frequency band and the volume control signal received from the radio signal selecting unit 39.

The microcontroller 38 increases or decreases the radio frequency band by controlling the tuner IC 32 and volumes up/down the radio volume by controlling the volume IC 33.

Also, the microcontroller 38 receives the frequency band and the volume control signal received from the signal selecting unit 39 and displays the radio frequency band and the volume level on the second display unit 23. In this case, the second display unit 23 can display a TV channel number and a TV volume level.

The TV button unit 70 includes a power switch sw5 for selecting the television function, a menu switch sw6, a setting switch sw7, volume switches sw8 and sw9, and channel up/down switches sw10 and sw11.

The TV button unit 70 is connected with the TV driving circuit 50. The TV driving circuit 50 includes a TV power unit 51 for supplying power, a main controller 40 for controlling the TV driving circuit 50 or the radio tuner 30, a TV antenna 56 for receiving a TV signal, a main power switch 55, a cooling fan 60 for releasing externally heat generated inside the unit providing the TV function and the ratio function; and an A/V input terminal 52.

The voice data according to the TV function is outputted through the speaker 22. Namely, a signal inputted through the TV button unit 70 is transferred to the main controller 40, and the main controller 40 controls the TV driving circuit 50 according to the inputted signal.

The power unit 51 includes a 5V power supply unit for supplying power (130 mA) of DC 5V to the radio tuner 30, a 12V power supply unit for supplying power to the LCD lamp (not shown), a 33V power supply unit for supplying power to a tuner (not shown) of the TV set, and a 3.3V power supply unit for supplying power to various modules.

A feature of the detailed circuit diagram of the present invention is that the main controller 40 can reduce power consumption by selectively controlling the radio tuner 30 and the TV driving circuit 50.

Figures 5, 6:
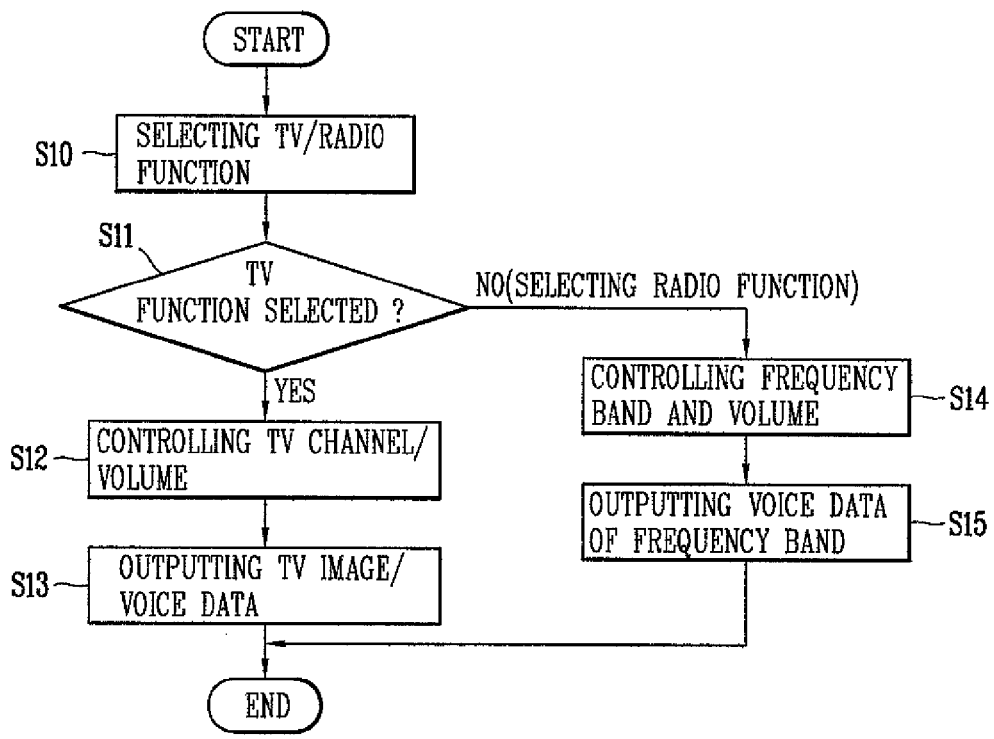
FIG. 5 is a flow chart of a method for providing the TV function and the radio function of the refrigerator in accordance with the present invention.
FIG. 6 is a table showing control states according to performing of the radio function and the TV function of the refrigerator in accordance with the present invention.

FIG. 5 is a flow chart of a method for providing the TV function and the radio function of the refrigerator in accordance with the present invention.

First, the user turns on the main power switch 55 and selects the TV function or the radio function (step S10).

The main controller 40 controls the refrigerating device and the cooling device of the refrigerator and also receives a select signal outputted through the power switch sw0 constructed at the radio signal selecting unit 39 or the power switch sw5 constructed at the TV button unit 70. For example, when the user turns on the main power switch 55 and selects the power switch sw5 of the TV button unit 70, the main controller 40 applies power to the TV driving circuit 50 in order to select the TV function.

According to a control signal of the main controller 40, the TV driving circuit 50 selects a TV channel as inputted by the user, receives a TV broadcast program through the selected channel, and displays image data included in the received TV broadcast program on the TV screen 24. The TV driving circuit 50 controls a volume of voice data included in the received TV broadcast program according to a volume signal inputted by the user, and outputs the volume-controlled voice data to the speaker 22 (steps S12 and S13).

While the main controller 40 controls the refrigerating device and the freezing device of the refrigerator, when the power switch sw0 of the radio signal selector 39 is selected by the user, the main controller 40 applies power to the radio tuner 30 in order to select the radio function. For example, when the user turns on the main power switch 55 and selects the power switch sw0 of the radio signal selector 39, the main controller 40 supplies power to the radio tuner 30.

Then, the radio tuner 30 selects a frequency band of the radio inputted by the user according to a control signal of the main controller 40, receives voice data included in the selected frequency band, controls a volume of the received voice data according to a volume signal inputted by the user, and outputs the volume-controlled voice data to the speaker 22 (steps S14 and S15).

FIG. 6 is a table showing control states according to performing of the radio function and the TV function of the refrigerator in accordance with the present invention.

For example, while both the TV driving circuit 50 and the radio tuner 30 are in an OFF state, when the user selects the power switch sw5 of the TV button unit 70 in order to watch a TV program, the main controller 40 applies power to the TV driving circuit 50 in order to select the TV function.

While both the TV driving circuit 50 and the radio tuner 30 are in the OFF state, when the user selects the power switch sw0 of the radio signal selecting unit 39 in order to listen to a radio program, the main controller 40 applies power to the radio tuner 30 in order to select the radio function.

While the TV driving circuit 50 is in an ON state and the radio tuner 30 is in the OFF state, when the user selects the power switch sw0 of the radio signal selecting unit 39 in order to listen to a radio program, the main controller 40 turns off the power switch sw5 of the TV button unit 70 and applies power to the radio tuner 30 in order to select the radio function.

While the TV driving circuit 50 is in the OFF state and the radio tuner 30 is in the ON state, when the user selects the power switch sw5 of the TV button unit 39 in order to watch a TV program, the main controller 40 turns off the power switch sw0 of the radio signal selecting unit 39 and applies power to the TV driving circuit 50 in order to select the TV function.

Figure 7:
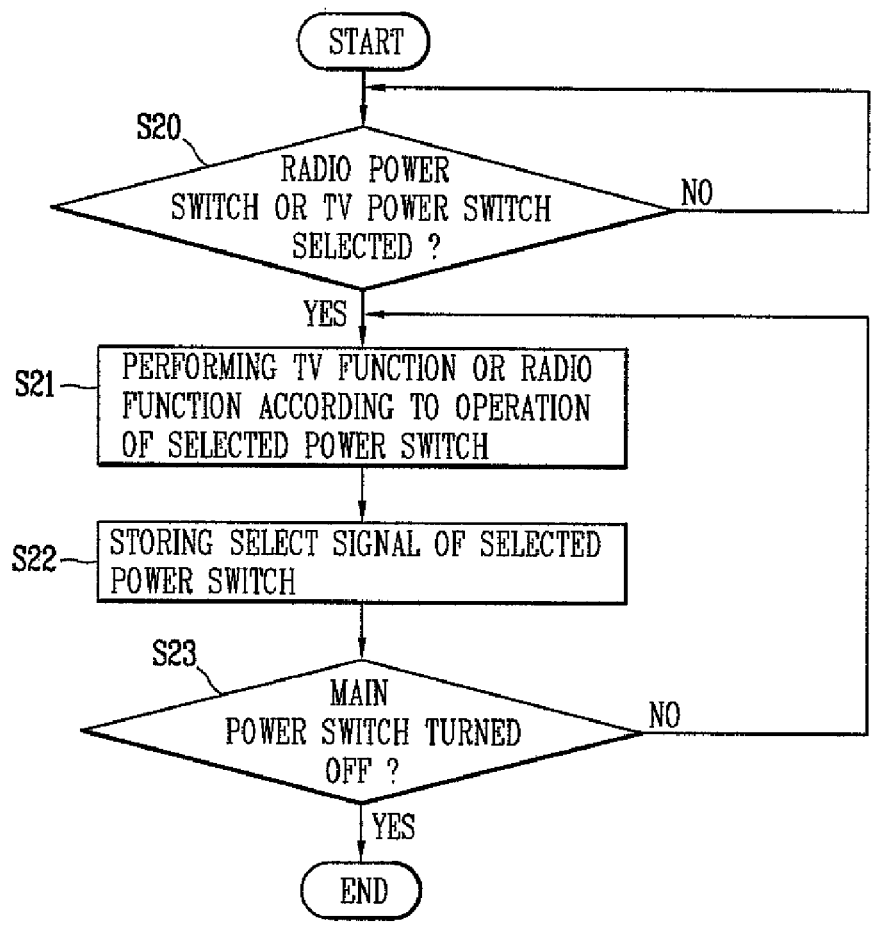
FIG. 7 is a flow chart of a method for automatically storing select signals of power switches for selecting the TV function and the radio function of the refrigerator in accordance with the present invention.
Figure 8:
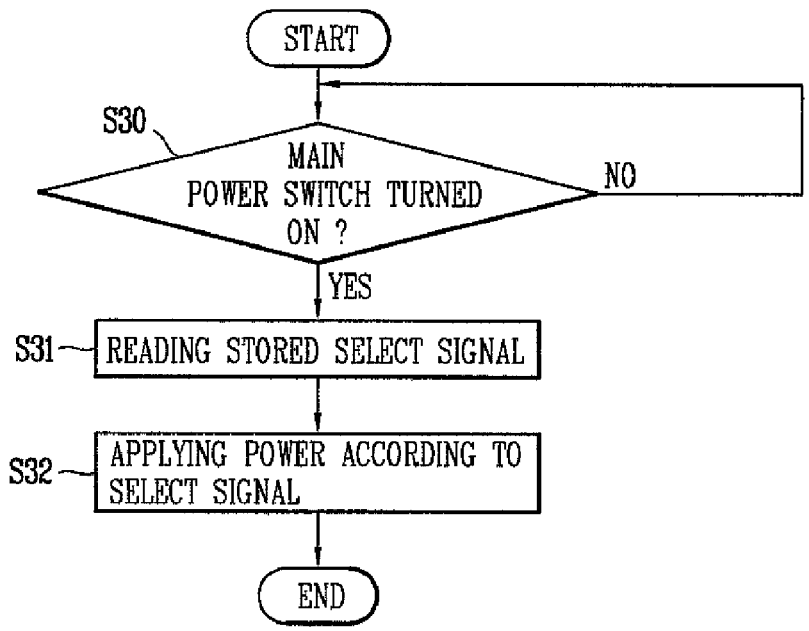
FIG. 8 is a flow chart of a method for automatically turning on a corresponding power switch according to each previously stored select signal of power switches for selecting the TV function and the radio function of the refrigerator in accordance with the present invention.

A method in which, in controlling the TV/radio function of the refrigerator, select signals (signals indicating an operation state of TV/radio power switches) of the TV power switch sw5 and the radio power switch sw0 are previously stored, and when the main power switch 55 is newly turned on by the user, the TV power switch sw5 or the radio power switch sw0 is automatically turned on according to the stored select signal, whereby the user can conveniently watch a TV broadcast program or listen to a radio broadcast program without having to turn on the TV power switch sw5 or the radio power switch sw0, will now be described with reference to FIGS. 4, 7 and 8. Herein, the main power switch 55 is a switch for applying main power to the unit for providing the TV function and the radio function.

FIG. 7 is a flow chart of a method for automatically storing select signals of power switches for selecting the TV function and the radio function of the refrigerator in accordance with the present invention.

First, with the main power switch 55 turned on, the user selects the TV power switch sw5 in order to select the TV function or selects the radio power switch sw0 in order to select the radio function (step S20). A select signal generated when the TV power switch sw5 or the radio power switch sw0 is selected is outputted to the main controller 40.

When the main controller 40 receives a select signal generated when the TV power switch sw5 is selected, it applies power to the TV driving circuit 50 in order to perform the TV function. Meanwhile, when the main controller 40 receives a select signal generated when the radio power switch sw0 is selected, it applies power to the radio tuner 30 in order to perform the radio function (step S21).

Thereafter, the main controller recognizes a power switch which has been finally turned on based on the select signal and stores the corresponding select signal in a non-volatile memory (i.e., read only memory (ROM) (not shown)). For example, the main controller 40 stores the select signal in the non-volatile memory, in order to automatically turn on the power switch (sw0 or sw5) which has been finally turned on when the main power switch 55 is turned on (step S22).

The main controller 40 determines whether the main power switch 55 is in the OFF state or in the ON state (step S23), and when the main power switch 55 is in the ON state, the main controller performs the TV function or the radio function according to the operation of the turned-on power switch. When the main power switch 55 is turned off, the main controller 40 stops the TV function and the radio function.

The method for automatically turning on the finally turned-on power switch (sw0 or sw5) based on a select signal stored when the main power switch 55 is turned on will now be described with reference to FIG. 8.

FIG. 8 is a flow chart of a method for automatically turning on a corresponding power switch according to each previously stored select signal of the power switches for selecting the TV function and the radio function of the refrigerator in accordance with the present invention.

First, when the user newly turns on the main power switch 55 in order to watch a TV broadcast program or listen to a radio program (step S30), the main controller 40 reads the stored select signal (step S31).

The main controller applies power to the TV driving circuit 50 or to the ratio tuner 30 according to the read select signal. For example, when the read select signal is a select signal which has been generated when the radio power switch sw0 was finally turned on, the main controller 40 applies power to the radio tuner 30. Meanwhile, if the read select signal is a select signal generated when the TV power switch sw5 was finally turned on, the main controller 40 applies power to the TV driving circuit 50 (step S32).

Accordingly, in the refrigerator, in controlling the TV/radio function, the TV power switch sw5 and the radio power switch sw0 are previously stored, and when the main power switch 55 is newly turned on, power is automatically applied to the TV driving circuit 50 or to the radio tuner 30 according to the stored select signal. Thus, the user does not need to turn on the TV power switch sw5 or the radio power switch sw0 and watch a TV program or listen to a radio program conveniently.

A method for controlling the cooling fan 60 installed at the unit for providing the TV/radio function of the refrigerator will now be described in detail. When the TV power switch sw5 or the radio power switch sw0 is turned on, when the TV driving circuit 50 and the cooling fan 60 or the radio turner 30 and the cooling fan 60 are simultaneously driven, a phenomenon that to the TV driving circuit 50 or the radio tuner 30 is damaged due to an overcurrent applied thereto. Thus, a method for controlling the cooling fan 60 in order to prevent the TV driving circuit 60 and the radio tuner 30 from being damaged due to the overcurrent will now be described in detail with reference to FIGS. 4 and 8.

Figure 9:
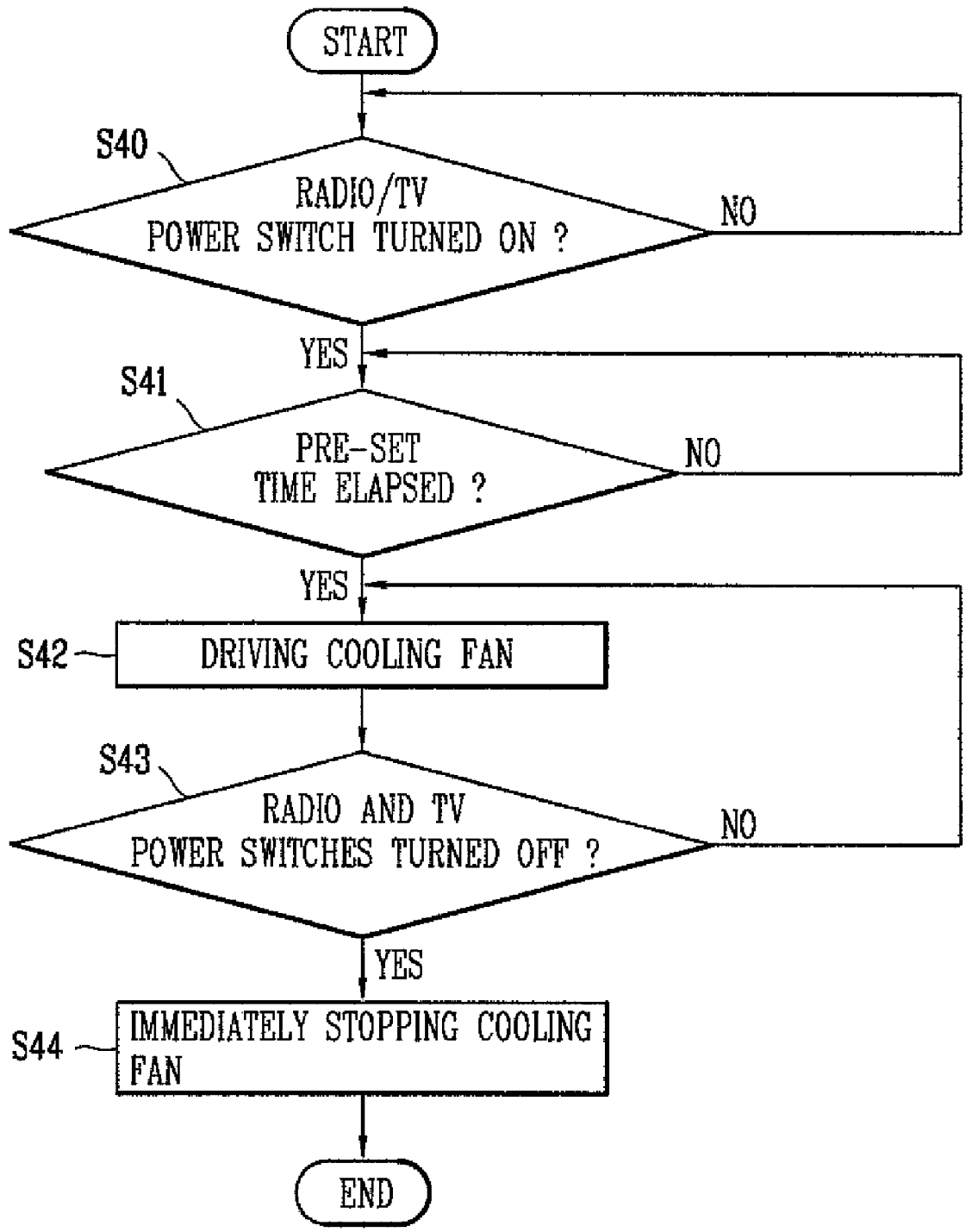
FIG. 9 is a flow chart of a method for controlling a cooling fan for releasing heat generated from the unit providing the TV/radio function installed at the refrigerator in accordance with the present invention.

FIG. 9 is a flow chart of a method for controlling a cooling fan for releasing heat generated from the unit providing the TV/radio function installed at the refrigerator in accordance with the present invention.

The cooling fan 60 is operated to releasing heat generated from the TV driving circuit 50 and the radio tuner 30, so preferably, the cooling fan 60 is installed at a rear surface of the TV screen (i.e., the LCD) where the TV driving circuit and the radio tuner 30 are installed.

First, the main power switch 55 of the unit for providing the TV function and the radio function installed at the refrigerator is turned on by the user. At this time, the cooling fan 60 is maintained in an OFF state.

Thereafter, a user turns on the TV power switch sw5 or the radio power switch sw0 in order to watch a TV broadcast program or a radio program (step S40).

When the TV power switch sw5 or the radio power switch sw0 is turned on, the main controller 40 determines whether a pre-set time elapses, and when the pre-set time elapses, the main controller 40 drives the cooling fan 60.

For example, when the TV power switch sw5 is turned on, the main controller 40 determines whether a pre-set time (e.g., 2~3 seconds) has elapsed, and when the pre-set time has elapsed, the main controller 40 drives the cooling fan 60. Meanwhile, when the radio power switch sw0 is turned on, the main controller 40 determines whether a pre-set time (e.g., 2~3 minutes) has elapsed, and when the pre-set time has elapsed, the main controller 40 drives the cooling fan 60 (steps S41 and S42).

Thus, since the cooling fan 60 is driven when the pre-set time elapses after the TV power switch sw5 or the radio power switch sw0 is turned on, the TV driving circuit 50 and the radio tuner 30 can be prevented from being damaged by an overcurrent. In addition, since power is applied to the cooling fan when 2~3 seconds elapses after the TV power switch or the radio power switch is turned on, power consumption can be reduced.

Thereafter, the main controller determines whether both the TV power switch sw5 and the radio power switch sw0 are turned off, and when the TV power switch sw5 and the radio power switch sw0 are all turned off, the main controller immediately stops the cooling fan 60 (steps S43 and S44). In this case, preferably, the main controller 40 determines whether the TV power switch sw5 and the radio power switch sw0 are all turned off based on a select signal generated when the TV power switch sw5 and the radio power switch sw0 are turned on.

Thus, since power being supplied to the cooling fan 60 is cut off immediately when the TV power switch and the radio power switch are all turned off, unnecessary power consumption can be reduced.

As so far described, the refrigerator in accordance with the present invention has many advantages.

First, by providing the TV function and the radio function at the refrigerator, a user can watch a TV program or listen to a radio program without installation of an additional TV set or a radio set in a kitchen or the like where a refrigerator is positioned.

Second, because the general control operation of the refrigerator, the radio tuner and the TV driving circuit are selectively controlled through one main controller, power consumption can be reduced.

Third, in controlling the TV/radio function, each select signal of the TV power switch sw5 and the radio power switch sw0 is previously stored, and then, when the main power switch 55 is newly turned on, power is automatically applied to the TV driving circuit 50 or to the radio tuner 30 according to the stored select signal. Accordingly, the user can watch a TV broadcast program or listen to a radio broadcast program conveniently without having to turn on the TV power switch sw5 or the radio power switch sw0.

Fourth, since the cooling fan 60 is operated when a pre-set time elapses after the TV power switch sw5 or the radio power switch sw0 is turned on, the TV driving circuit 50 and the radio tuner 30 can be prevented from being damaged due to a possible overcurrent applied thereto, and also, power consumption can be reduced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A refrigerator, comprising:
a main controller configured to select a TV function or a radio function according to a user's request;
a radio tuner configured to receive voice data included in a frequency band of a radio set when the radio function is selected by the main controller;
a TV driving circuit configured to receive a TV broadcast program when the TV function is selected by the main controller and output image data and voice data included in the TV broadcast program;
a TV screen installed at a front surface of a refrigerator body and configured to display the image data;
a cooling fan installed at a rear surface of the TV screen and configured to externally release heat generated when the TV function or the radio function is selected; and
a speaker configured to output the voice data included in the TV broadcast program or the voice data included in the frequency band, wherein the main controller stores a select signal generated when a switch that selects the TV function or the radio function is turned on, and wherein when main power that controls the radio tuner and the TV driving circuit is newly applied according to a user's request, the main controller automatically applies power to the TV driving circuit or to the radio tuner based on the stored select signal.

2. The refrigerator of claim 1, wherein the radio tuner receives the voice data included in the frequency band selected by a user and controls a volume of the received voice data according to a volume control signal input by the user.

3. The refrigerator of claim 1, wherein the main controller drives the cooling fan when a pre-set time elapses.

4. The refrigerator of claim 1, wherein the main controller drives the cooling fan after controlling the TV driving circuit or the radio tuner.

5. The refrigerator of claim 1, wherein the main controller immediately stops the cooling fan when an operation of the TV driving circuit and the radio tuner is stopped.

6. The refrigerator of claim 1, wherein the main controller applies power to the cooling fan when a pre-set time elapses after a switch that applies power to the TV driving circuit or to the radio tuner is turned on.

7. The refrigerator of claim 1, wherein the TV screen comprises a Liquid Crystal Display or a Plasma Display Panel.

8. A refrigerator, comprising:
a first display configured to display a temperature inside a refrigerator;
a main controller configured to select a TV function or a radio function according to a user's request;
a radio tuner configured to receive voice data included in a frequency band of a radio set when the radio function is selected by the main controller;
a TV driving circuit configured to receive a TV broadcast program when the TV function is selected by the main controller and output image data and voice data included in the TV broadcast program;
a TV screen installed at a front surface of a refrigerator body and configured to display the image data;
a cooling fan installed at a rear surface of the TV screen and configured to externally release heat generated when the TV function or the radio function is selected;
a speaker configured to output the voice data included in the TV broadcast program or the voice data included in the frequency band; and
a second display configured to display the frequency band of the radio set and a volume of the voice data included in the frequency band, or display a TV channel number corresponding to the broadcast program and a volume of the voice data included in the broadcast program, wherein the main controller stores a select signal generated when a switch that selects the TV function or the radio function is turned on, and wherein when main power that controls the radio tuner and the TV driving circuit is newly applied according to a user's request, the main controller automatically applies power to the TV driving circuit or to the radio tuner based on the stored select signal.

9. The refrigerator of claim 8, wherein the main controller drives the cooling fan when a pre-set time elapses.

10. The refrigerator of claim 8, wherein the main controller drives the cooling fan after controlling the TV driving circuit or the radio tuner.

11. The refrigerator of claim 8, wherein the main controller applies power to the cooling fan when a pre-set time elapses after a switch that applies power to the TV driving circuit or to the radio tuner is turned on.

12. The refrigerator of claim 8, wherein the main controller immediately stops the cooling fan when an operation of the TV driving circuit and the radio tuner is stopped.

13. The refrigerator of claim 8, wherein the TV screen comprises a Liquid Crystal Display or a Plasma Display Panel.

14. A refrigerator, comprising:
- a first display configured to display a temperature inside a refrigerator;
- a main controller configured to select a TV function or a radio function according to a user's request;
- a radio tuner configured to receive voice data included in a frequency band of a radio set when the radio function is selected by the main controller;
- a TV driving circuit configured to receive a TV broadcast program when the TV function is selected by the main controller and output image data and voice data included in the TV broadcast program;
- a Liquid Crystal Display installed at a front surface of a refrigerator body and configured to display the image data;
- a speaker configured to output the voice data included in the TV broadcast program or the voice data included in the frequency band;
- a second display configured to display the frequency band of the radio set and a volume of the voice data included in the frequency band, or to display a TV channel number corresponding to the broadcast program and a volume of the voice data included in the broadcast program; and
- a cooling fan installed at a rear surface of the Liquid Crystal Display and configured to externally release heat generated when the TV function or the radio function is selected, wherein when a switch that applies power to the TV driving circuit or to the radio tuner is turned on, the main controller applies power to the cooling fan after a pre-set time elapses, wherein when an operation of the TV driving circuit and the radio tuner is stopped, the main controller immediately stops the cooling fan, wherein the main controller stores a select signal generated when a switch that selects the TV function or the radio function is turned on, and wherein when main power that controls the radio tuner and the TV driving circuit is newly applied according to a user's request, the main controller automatically applies power to the TV driving circuit or to the radio tuner based on the stored select signal.

* * * * *